US012564133B2

(12) United States Patent
Wu et al.

(10) Patent No.: US 12,564,133 B2
(45) Date of Patent: Mar. 3, 2026

(54) CLEANING SHIP FOR WATER SURFACE TREATMENT FOR HARVESTING WATER PLANTS

(71) Applicant: Suzhou Feichi Environmental Protection Technology Co., Ltd, Zhangjiagang (CN)

(72) Inventors: Cheng Wu, Zhangjiagang (CN); Fengliang Dong, Zhangjiagang (CN); Xiaoyu Xue, Zhangjiagang (CN); Lei Gao, Zhangjiagang (CN); Peisong Wu, Zhangjiagang (CN); Yunfei Qian, Zhangjiagang (CN); Lijing Yao, Zhangjiagang (CN); Junyi Shi, Zhangjiagang (CN)

(73) Assignee: Suzhou Feichi Environmental Protection Technology Co., Ltd, Zhangjiagang (CN)

( * ) Notice: Subject to any disclaimer, the term of this patent is extended or adjusted under 35 U.S.C. 154(b) by 399 days.

(21) Appl. No.: 18/460,312

(22) Filed: Sep. 1, 2023

(65) Prior Publication Data

US 2024/0081184 A1 Mar. 14, 2024

(30) Foreign Application Priority Data

Sep. 8, 2022 (CN) .......................... 202211096938.9

(51) Int. Cl.
*A01D 44/00* (2006.01)
*B63B 35/00* (2020.01)
(52) U.S. Cl.
CPC .............. *A01D 44/00* (2013.01); *B63B 35/00* (2013.01)

(58) Field of Classification Search
CPC ....................................................... A01D 44/00
See application file for complete search history.

(56) References Cited

U.S. PATENT DOCUMENTS 3,498,033 A * 3/1970 Huff ....................... A01D 44/00
56/9
5,404,696 A * 4/1995 Vasby .................... A01D 44/00
56/8
(Continued)

FOREIGN PATENT DOCUMENTS

CN          110667784 A * 1/2020 ............. A01D 43/00
CN          111094122 A * 5/2020 ............. B63B 35/32
(Continued)

OTHER PUBLICATIONS

English Translation of SU-1482576-A1 (Year: 1989).*
(Continued)

*Primary Examiner* — Claude J Brown

(57) ABSTRACT

The present invention relates to the field of water surface treatment, and in particular to a cleaning ship for water surface treatment for harvesting water plants. In order to solve the technical problems that the existing cleaning ship cannot adapt to the waters of different depths for harvesting water plants, and a hull has low load utilization rate for the collected water plants and affects the overall working efficiency and the fuel economy of the hull, the present invention provides a cleaning ship for water surface treatment for harvesting water plants, comprising a steel belt conveying mechanism, a driven shaft and the like. The steel belt conveying mechanism drives the driven shaft to rotate.

10 Claims, 8 Drawing Sheets

(56) References Cited

U.S. PATENT DOCUMENTS

| | | | | | |
|---|---|---|---|---|---|
| 5,598,688 | A | * | 2/1997 | Hsu | A01D 44/00 |
| | | | | | 56/8 |
| 5,775,073 | A | * | 7/1998 | Kelpin | A01D 44/00 |
| | | | | | 56/153 |

FOREIGN PATENT DOCUMENTS

| | | | | | |
|---|---|---|---|---|---|
| CN | 112219545 | A | * | 1/2021 | A01D 44/00 |
| CN | 112647476 | A | * | 4/2021 | B30B 9/3096 |
| CN | 112840846 | A | * | 5/2021 | A01D 44/00 |
| CN | 112930851 | A | * | 6/2021 | A01D 57/00 |
| CN | 113080181 | A | * | 7/2021 | E02B 15/10 |
| CN | 113678627 | A | * | 11/2021 | A01D 33/10 |
| CN | 113950945 | A | * | 1/2022 | A01D 57/20 |
| CN | 114013583 | A | * | 2/2022 | A01F 15/02 |
| CN | 114622528 | A | * | 6/2022 | A01D 43/00 |
| CN | 114703820 | A | * | 7/2022 | B01D 33/04 |
| CN | 114875866 | A | * | 8/2022 | E02B 15/10 |
| EP | 3295785 | A1 | * | 3/2018 | A01D 44/00 |
| GB | 2193113 | A | * | 2/1988 | A01D 44/00 |
| GB | 2230506 | A | * | 10/1990 | A01D 44/00 |
| GB | 2237490 | A | * | 5/1991 | A01D 44/00 |
| SU | 1482576 | A1 | * | 5/1989 | |

OTHER PUBLICATIONS

English Translation of CN-112647476-A (Year: 2021).*
English Translation of CN-110667784-A (Year: 2021).*
English Translation of CN-112219545-A (Year: 2021).*
English Translation of CN-113950945-A (Year: 2021).*
English Translation of CN-114013583-A (Year: 2022).*
English Translation of CN-112930851-A (Year: 2021).*
English Translation of CN-113678627-A (Year: 2021).*
English Translation of CN-114622528-A (Year: 2022).*
English Translation of CN-113080181-A (Year: 2021).*
English Translation of CN-112840846-A (Year: 2021).*
English Translation of CN-114875866-A (Year: 2022).*
English Translation of CN-111094122-A (Year: 2020).*
English Translation of CN-114703820-A (Year: 2022).*
English Translation of EP-3295785-A1 (Year: 2018).*

* cited by examiner

CLEANING SHIP FOR WATER SURFACE TREATMENT FOR HARVESTING WATER PLANTS

CROSS-REFERENCE TO RELATED APPLICATIONS

This application claims priority of Chinese Patent Application No. 202211096938.9, filed on Sep. 8, 2022, the entire contents of which are incorporated herein by reference.

TECHNICAL FIELD

The present invention relates to the field of water surface treatment, and in particular to a cleaning ship for water surface treatment for harvesting water plants.

BACKGROUND

For aquatic ecology, too many water plants may increase night oxygen consumption, exacerbate underwater hypoxia, increase the daily range of pH value, and compete for the living space, and rotten and dead water plants may aggravate bottom deterioration and harm the growth of cultured organisms.

A cleaning ship for harvesting water plants is used for regularly harvesting the water plants in the water. For example, Chinese patent CN211210547U provides a water plant harvesting mechanism and a harvesting ship. The device has the function of uprooting the water plants, but in the process of treatment, a water plant pulling mechanism needs to go deep below the water surface and contact a river bed, so the overall device is required to have high waterproof performance, which certainly increases the production and later maintenance cost, and the device is not suitable for harvesting the water plants in deep waters and the water system of uneven river beds. In addition, the water plants collected by the cleaning ship for harvesting water plants has a huge water content, and there are more gaps between the water plants which are stacked together. Therefore, a hull has low load utilization rate for the collected water plants and needs to return to unload the water plants to a shore repeatedly, which affects the overall working efficiency and the fuel economy of the hull.

SUMMARY

To overcome the disadvantages that the existing cleaning ship cannot adapt to the waters of different depths for harvesting water plants, and a hull has low load utilization rate for the collected water plants and affects the overall working efficiency and the fuel economy of the hull, the present invention provides a cleaning ship for water surface treatment for harvesting water plants.

The technical solution of the present invention is as follows: a cleaning ship for water surface treatment for harvesting water plants comprises a hull, an installing frame, a fixed plate, a steel belt conveying mechanism, a driven shaft, a push block, a limiting plate, cutters and a cutting mechanism. The installing frame is installed on the front side of the hull; the upper side of the installing frame is fixedly connected with the fixed plate; the steel belt conveying mechanism is installed in the middle of the fixed plate; the lower side of the fixed plate is rotatably connected with the driven shaft; the left end of the driven shaft is fixedly connected with a second spur gear; a first motor on the upper side of the steel belt conveying mechanism drives the entire steel belt conveying mechanism to conduct conveying work; at the same time, a power shaft on the lower side of the steel belt conveying mechanism drives the driven shaft to rotate through engagement of a first spur gear and the second spur gear; water plants are hooked by a plurality of toothed plates fixedly connected on the surface of the driven shaft, and pulled upward with the cooperation of an elastic sheet fixedly connected on the outer surface of each conveying steel belt in the steel belt conveying mechanism; an adjusting assembly is installed on the rear side of the fixed plate; the front side of the adjusting assembly is connected with the push block, and in the process that the elastic sheet and the toothed plates pull the water plants, the push block uproots the water plants from the middle ends of the water plants; the front side of the fixed plate is fixedly connected with the limiting plate; a rolling assembly is installed on the rear side of the limiting plate; the front side of the rolling assembly is connected with a plurality of cutters; the cutters preliminarily cut off the water plants stacked together; the rolling assembly is matched with the conveying steel belt to remove most of water in the water plants; and then the water plants are cut up by the cutting mechanism installed at the rear of the fixed plate.

Further, the cutting mechanism comprises a roller body, a second motor, blades and a baffle plate; the rear part of the upper side of the fixed plate is rotatably connected with the roller body; the rear side of the fixed plate is fixedly connected with the second motor; an output shaft of the second motor is fixedly connected with the roller body; a plurality of blades are fixedly connected around an outer surface of the roller body; the rear side of the fixed plate is fixedly connected with the baffle plate, and the baffle plate surrounds the rear side of the roller body.

Further, the lower side of the baffle plate is provided with a plurality of structures of discharge holes.

Further, the front end of the push block is configured as a cambered surface structure.

Further, the front side of the push block is fixedly connected with a plurality of dividing strips at equal distances.

Further, the limiting plate and the conveying steel belt on the upper side of the steel belt conveying mechanism have a backward contracted bucket-shaped structure.

Further, the rear ends of the cutters are configured as upward bent arc structures.

Further, the adjusting assembly comprises a first rotating shaft, a pull plate, a first electric push rod, guide rails, sliding brackets and second electric push rods; the rear side of the fixed plate is rotatably connected with the first rotating shaft; the lower side of the first rotating shaft is fixedly connected with the pull plate; the rear side of the fixed plate is rotatably connected with the first electric push rod through the rotating shaft; the telescopic end of the first electric push rod is rotatably connected with the pull plate through the rotating shaft; the left end and the right end of the first rotating shaft are fixedly connected with a guide rail respectively; the middle of each of the two guide rails is slidably connected with a sliding bracket respectively; a second electric push rod is fixedly connected between the two guide rails and the sliding brackets respectively; and the two sliding brackets are fixedly connected with the push block.

Further, the rolling assembly comprises a press roller, cams, a second rotating shaft, shifting levers and torsion springs; the rear side of the limiting plate is rotatably connected with the press roller; the left end and the right end of the press roller are fixedly connected with a cam respectively; the rear side of the limiting plate is rotatably connected with the second rotating shaft, and the second rotating shaft is located on the front side of the press roller; the left end and the right end of the second rotating shaft are fixedly connected with a shifting lever respectively; a torsion spring is fixedly connected respectively between the two shifting levers and the limiting plate, and the torsion springs are sleeved on the outer surface of the second rotating shaft; and each cutter is fixedly connected to the middle of the second rotating shaft.

Further, a plurality of structures of bumps are arranged around the outer surface of the press roller.

The present invention has the beneficial effects: in the cleaning ship for water surface treatment for harvesting water plants, the steel belt conveying mechanism is arranged on the front side of the hull; the first motor on the upper side of the steel belt conveying mechanism drives the entire steel belt conveying mechanism to conduct conveying work; at the same time, the lower side of the steel belt conveying mechanism drives the driven shaft to rotate; the water plants are hooked by a plurality of toothed plates fixedly connected on the surface of the driven shaft, and pulled upward with the cooperation of the elastic sheet fixedly connected on the outer surface of each conveying steel belt in the steel belt conveying mechanism; in the process that the elastic sheet and the toothed plates pull the water plants, the push block which moves forward with the hull uproots the water plants from the middle ends of the water plants; the front side of the installed rolling assembly is connected with a plurality of cutters; the cutters preliminarily cut off the water plants stacked together; the rolling assembly is matched with the conveying steel belt to remove most of water in the water plants; and then the water plants are cut up by the cutting mechanism installed at the rear of the fixed plate, to efficiently complete the harvesting work of the water plants.

The push block used in the above step does not need to go deep below the water surface, can be adjusted with the depth of the water, and only needs to go down to half the water depth. Therefore, the requirement for the waterproof performance of the entire device is not high. Moreover, in the process of conveying the water plants, the collected water plants are squeezed to make the water come out, crushed and cut in time, so that the water plants can be stacked together closely to improve the load utilization rate of the hull for the water plants, reduce the working frequency of returning to a shore to unload the water plants and improve the overall working efficiency and the fuel economy of the hull.

Figures 1, 2:
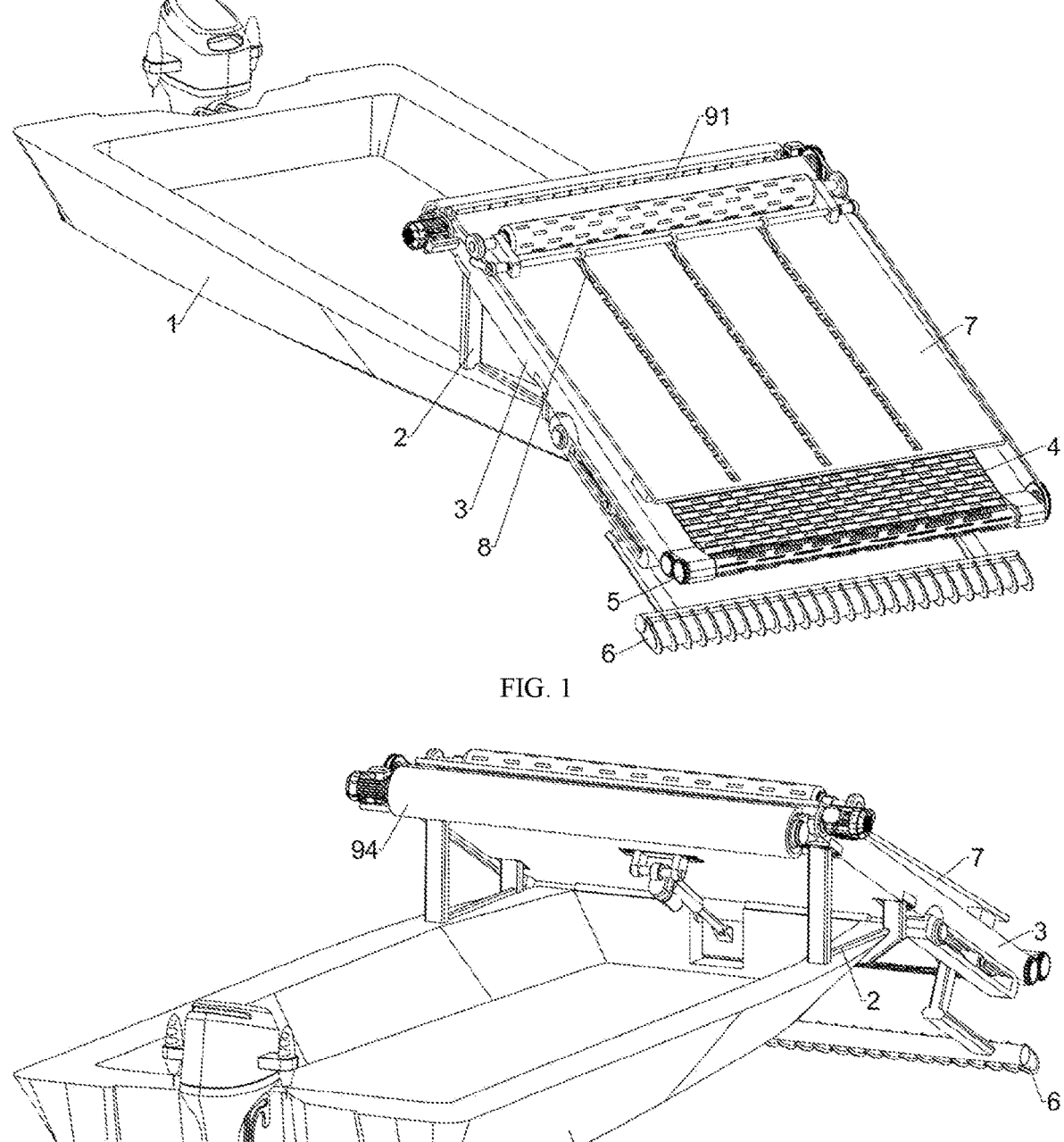
FIG. 1 is a first three-dimensional structural schematic diagram of the present application.
FIG. 2 is a second three-dimensional structural schematic diagram of the present application.

Reference Signs: 1—hull, 2—installing frame, 3—fixed plate, 4—steel belt conveying mechanism, 41—conveying steel belt, 411—elastic sheet, 42—first motor, 43—power shaft, 431—first spur gear, 5—driven shaft, 51—second spur gear, 52—toothed plate, 6—push block, 61—dividing strip, 7—limiting plate, 8—cutter, 91—roller body, 92—second motor, 93—blade, 94—baffle plate, 941—discharge hole; 101—first rotating shaft, 102—pull plate, 103—first electric push rod, 104—guide rail, 105—sliding bracket, 106—second electric push rod, 201—press roller, 2011—bump, 202—cam, 203—second rotating shaft, 204—shifting lever, and 205—torsion spring.

DETAILED DESCRIPTION

The present invention will be specifically described below with reference to the drawings.

Embodiments

A cleaning ship for water surface treatment for harvesting water plants, as shown in FIG. 1 to FIG. 12, comprises an adjusting assembly, a rolling assembly, a hull 1, an installing frame 2, a fixed plate 3, a steel belt conveying mechanism 4, a driven shaft 5, a push block 6, a limiting plate 7, cutters 8 and a cutting mechanism. The installing frame 2 is installed on the front side of the hull 1; the upper side of the installing frame 2 is connected with the fixed plate 3 by a bolt; the steel belt conveying mechanism 4 is installed in the middle of the fixed plate 3; a plurality of elastic sheets 411 are welded on the outer surface of each conveying steel belt 41 of the steel belt conveying mechanism 4; a first motor 42 is installed on the upper side of the steel belt conveying mechanism 4; the left end of a power shaft 43 located on the lower side of the steel belt conveying mechanism 4 is fixedly connected with a first spur gear 431; the lower side of the fixed plate 3 is rotatably connected with the driven shaft 5; the left end of the driven shaft 5 is fixedly connected with a second spur gear 51; the first spur gear 431 is engaged with the second spur gear 51; a plurality of toothed plates 52 are fixedly connected around an outer surface of the driven shaft 5; the adjusting assembly is installed on the rear side of the fixed plate 3; the front side of the adjusting assembly is connected with the push block 6; the front end of the push block 6 is configured as a cambered surface structure; the front side of the push block 6 is fixedly connected with a plurality of dividing strips 61 at equal distances; the front side of the fixed plate 3 is connected with the limiting plate 7 by a bolt; the limiting plate 7 and the conveying steel belt 41 on the upper side of the steel belt conveying mechanism 4 have a backward contracted bucket-shaped structure; the rolling assembly is installed on the rear side of the limiting plate 7; the front side of the rolling assembly is connected with a plurality of cutters 8; the rear ends of the cutters 8 are configured as upward bent arc structures; and the cutting mechanism is installed at the rear part of the upper side of the fixed plate 3.

Figure 11:
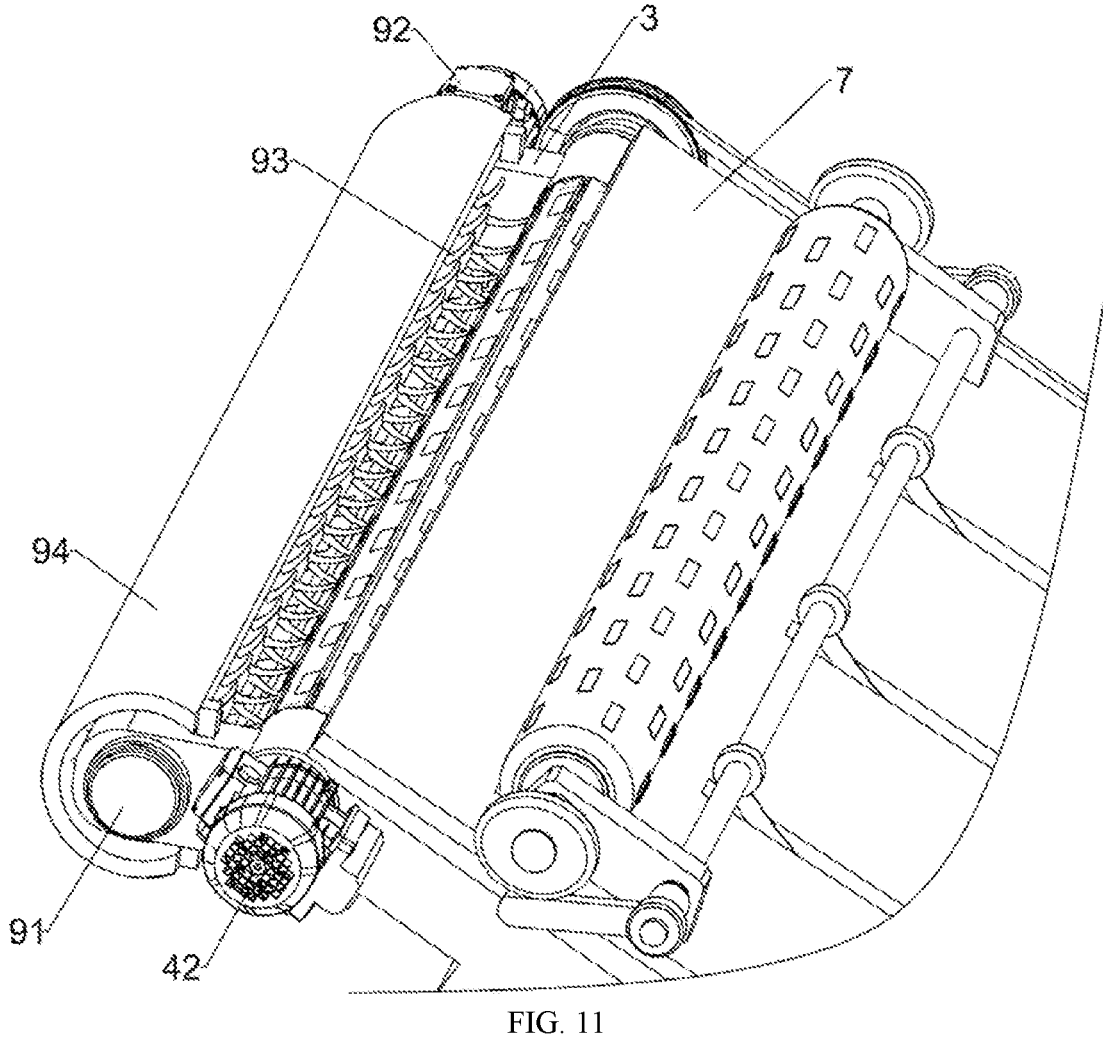
FIG. 11 is a three-dimensional structural schematic diagram of a cutting mechanism in the present application.
Figure 12:
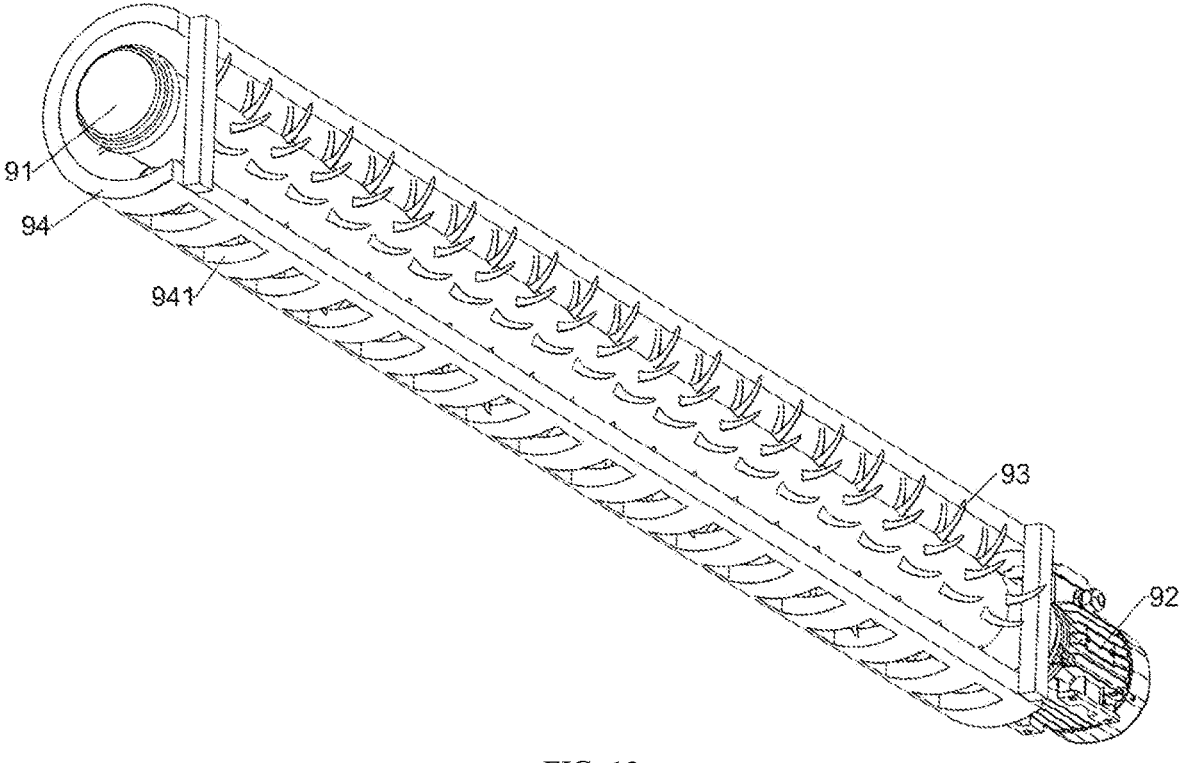
FIG. 12 is a three-dimensional structural schematic diagram of a baffle plate in the present application.

As shown in FIG. 11 and FIG. 12, the cutting mechanism comprises a roller body 91, a second motor 92, blades 93 and a baffle plate 94; the rear part of the upper side of the fixed plate 3 is rotatably connected with the roller body 91; the rear side of the fixed plate 3 is connected with the second motor 92 by a bolt; an output shaft of the second motor 92 is fixedly connected with the roller body 91; a plurality of blades 93 are fixedly connected around an outer surface of the roller body 91; the rear side of the fixed plate 3 is connected with the baffle plate 94 by a bolt, and the baffle plate 94 surrounds the rear side of the roller body 91; and the lower side of the baffle plate 94 is provided with a plurality of structures of discharge holes 941.

Figures 3, 4:
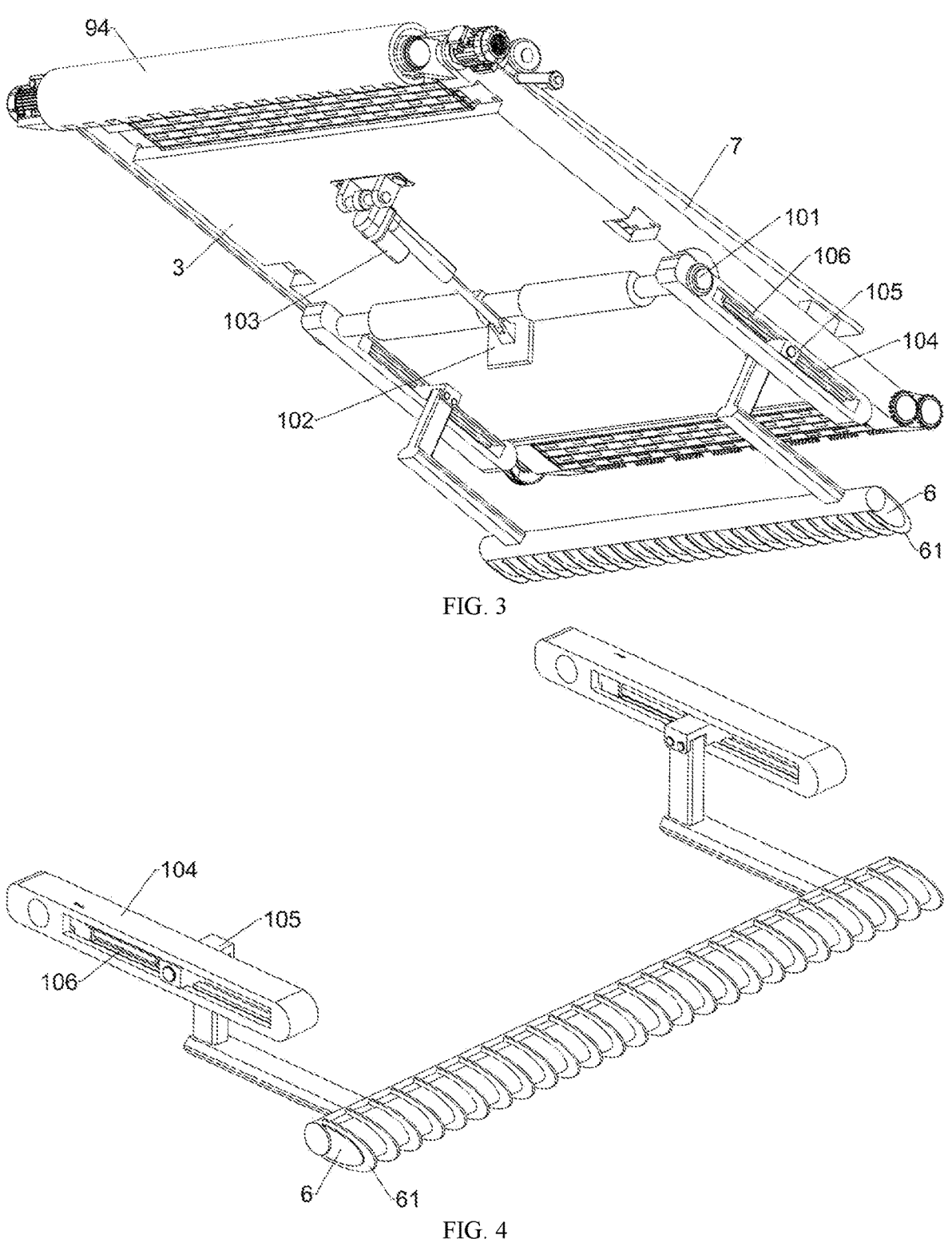
FIG. 3 is a three-dimensional structural schematic diagram of a fixed plate and an adjusting assembly in the present application.
FIG. 4 is a local three-dimensional structural schematic diagram of an adjusting assembly in the present application.
Figure 5:
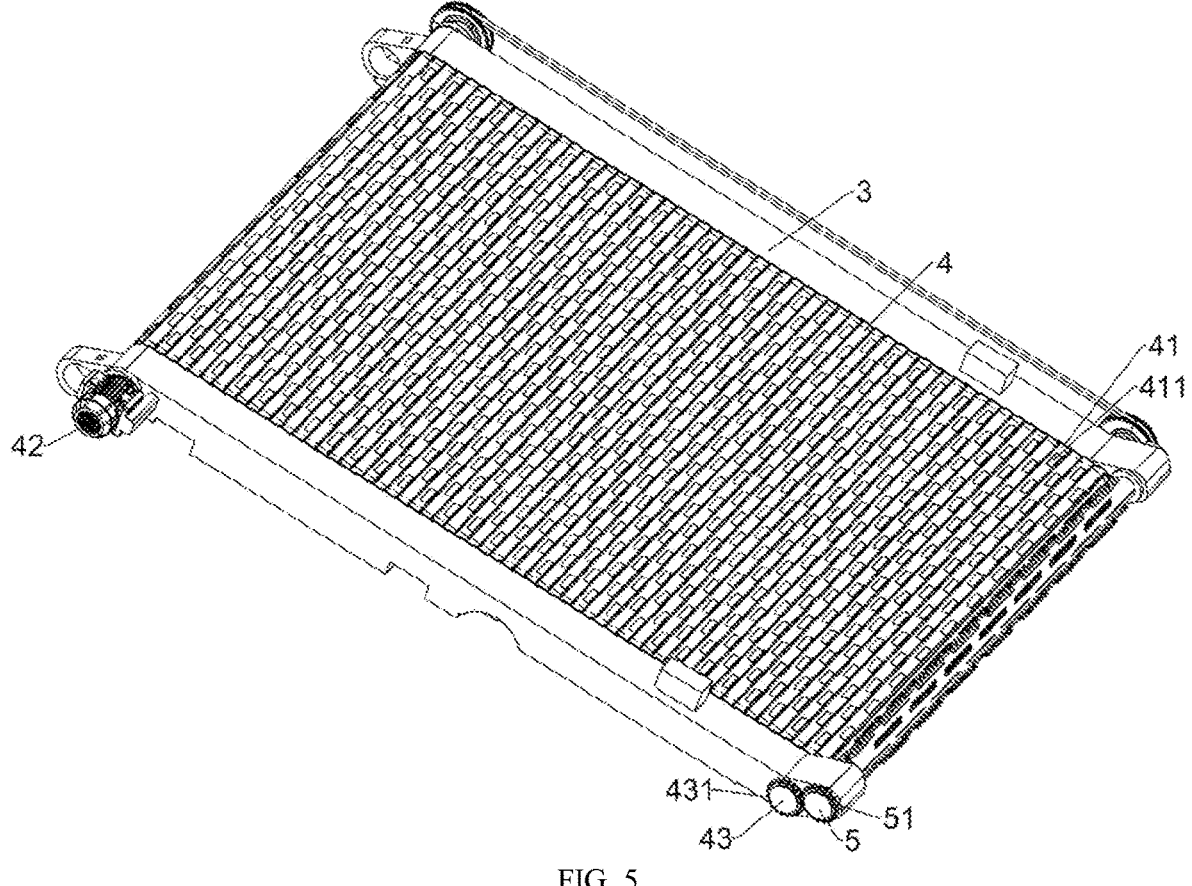
FIG. 5 is a three-dimensional structural schematic diagram of a steel belt conveying mechanism in the present application.
Figure 6:
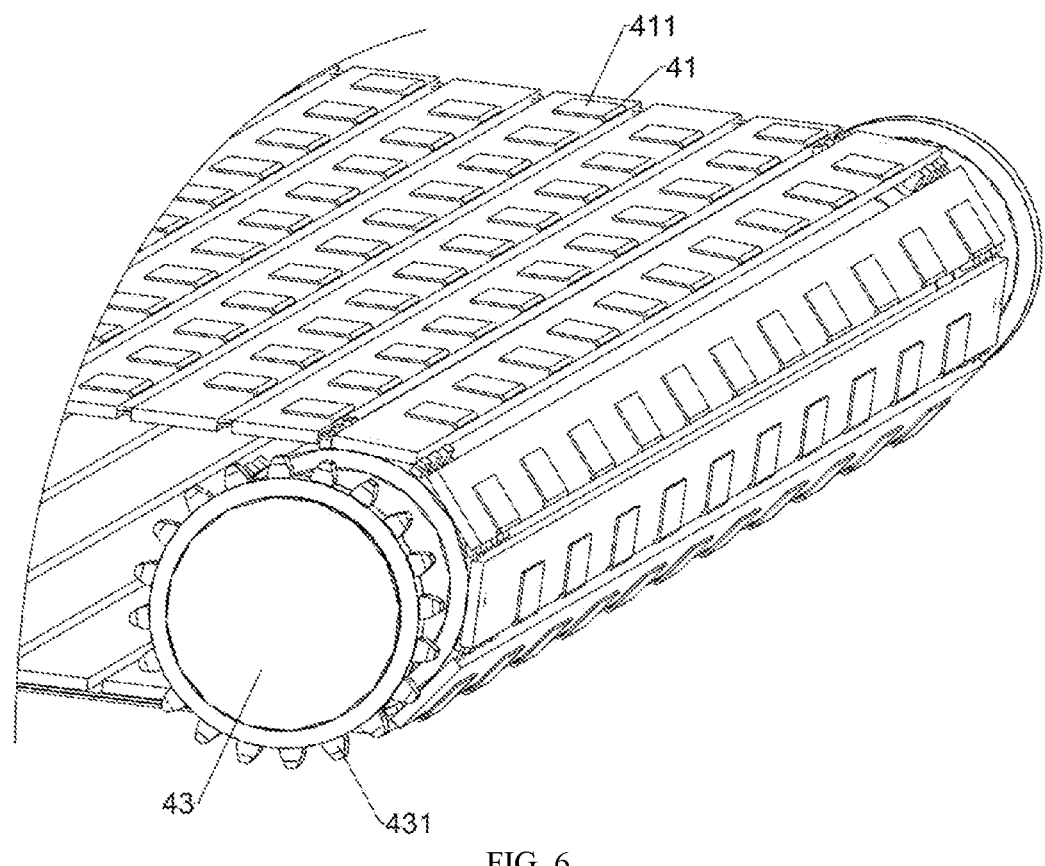
FIG. 6 is a three-dimensional structural schematic diagram of a conveying steel belt in the present application.

As shown in FIG. 3 and FIG. 4, the adjusting assembly comprises a first rotating shaft 101, a pull plate 102, a first electric push rod 103, guide rails 104, sliding brackets 105 and second electric push rods 106; the rear side of the fixed plate 3 is rotatably connected with the first rotating shaft 101; the lower side of the first rotating shaft 101 is welded with the pull plate 102; the rear side of the fixed plate 3 is rotatably connected with the first electric push rod 103 through the rotating shaft; the telescopic end of the first electric push rod 103 is rotatably connected with the pull plate 102 through the rotating shaft; the left end and the right end of the first rotating shaft 101 are connected with a guide rail 104 respectively by bolts; the middle of each of the two guide rails 104 is slidably connected with a sliding bracket 105 respectively; a second electric push rod 106 is connected between the two guide rails 104 and the sliding brackets 105 respectively by bolts; and the two sliding brackets 105 are fixedly connected with the push block 6.

Figures 7, 8:
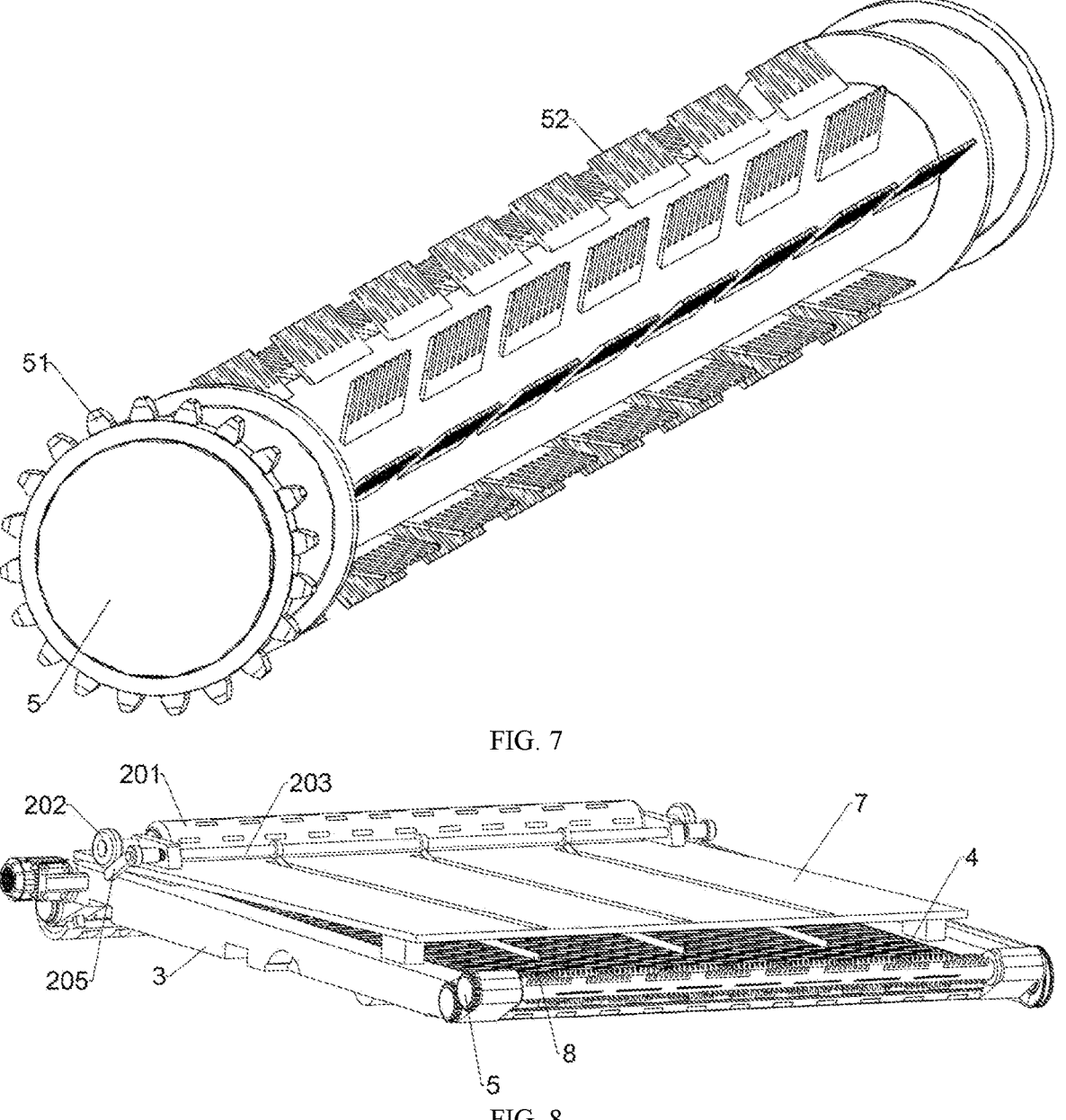
FIG. 7 is a three-dimensional structural schematic diagram of a driven shaft in the present application.
FIG. 8 is a three-dimensional structural schematic diagram of a fixed plate and a rolling assembly in the present application.
Figures 9, 10:
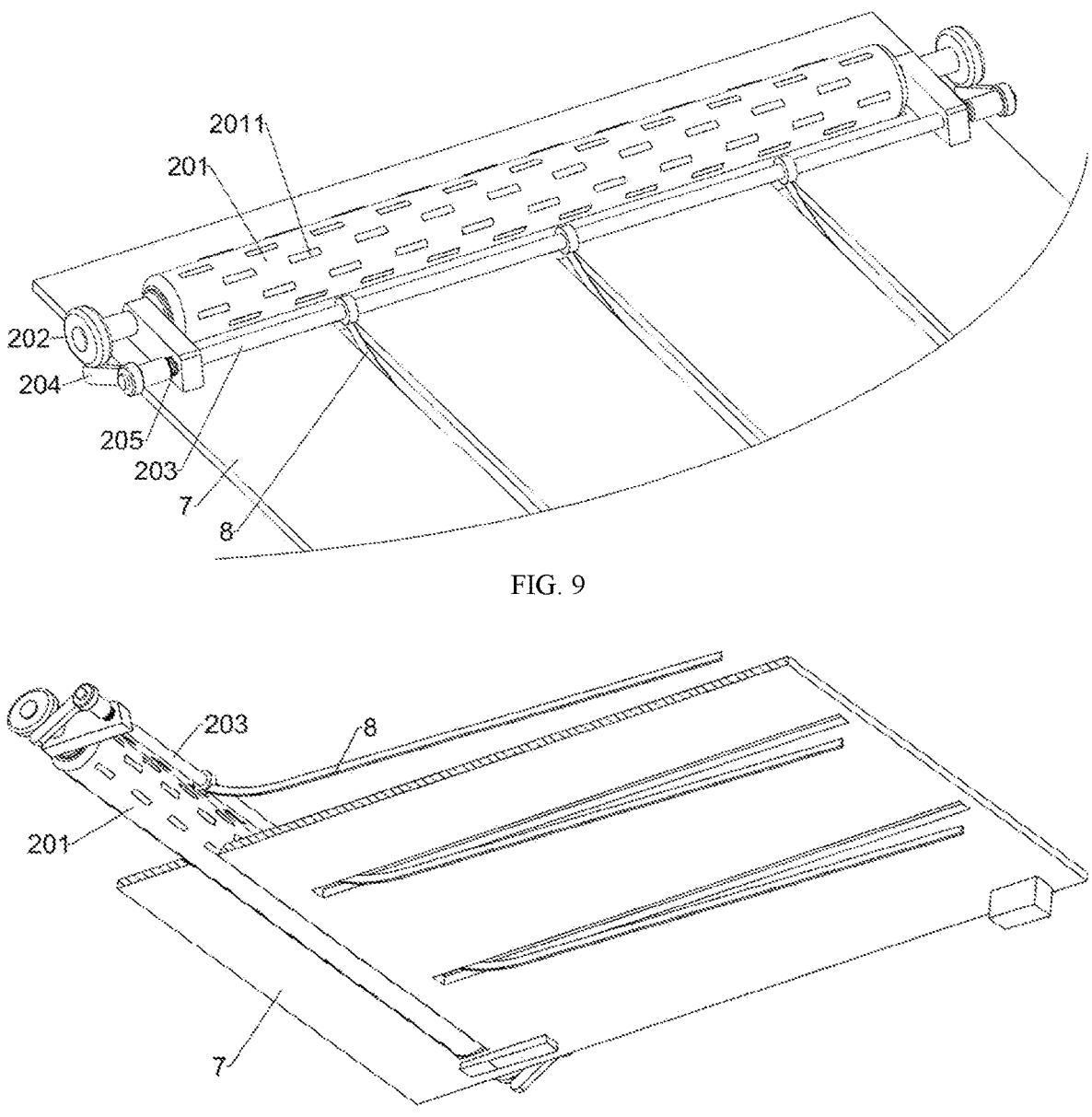
FIG. 9 is a three-dimensional structural schematic diagram of a rolling assembly in the present application.
FIG. 10 is a sectional view of a fixed plate in the present application.

As shown in FIG. 8 to FIG. 10, the rolling assembly comprises a press roller 201, cams 202, a second rotating shaft 203, shifting levers 204 and torsion springs 205; the rear side of the limiting plate 7 is rotatably connected with the press roller 201; the left end and the right end of the press roller 201 are fixedly connected with a cam 202 respectively; the rear side of the limiting plate 7 is rotatably connected with the second rotating shaft 203, and the second rotating shaft 203 is located on the front side of the press roller 201; the left end and the right end of the second rotating shaft 203 are fixedly connected with a shifting lever 204 respectively; a torsion spring 205 is fixedly connected respectively between the two shifting levers 204 and the limiting plate 7, and the torsion springs 205 are sleeved on the outer surface of the second rotating shaft 203; each cutter 8 is fixedly connected to the middle of the second rotating shaft 203; and a plurality of structures of bumps 2011 are arranged around the outer surface of the press roller 201.

When a driver drives the hull 1 on the water surface, the first motor 42 is started so that the steel belt conveying mechanism 4 drives the conveying steel belt 41 to rotate counterclockwise at the left viewing angle. At the same time, the rotating power shaft 43 in the steel belt conveying mechanism 4 drives the first spur gear 431 to rotate, and the first spur gear 431 is engaged with the second spur gear 51 to drive the driven shaft 5 to rotate. When the driven shaft 5 drives the toothed plate 52 to rotate clockwise at the left viewing angle, the toothed plate 52 presses the front water plants down into the water surface. After the driven shaft 5 passes through the water plants below the water surface, the rotating toothed plate 52 hooks the water plants up during the upward rebound of the water plants. At the same time, the rotating conveying steel belt 41 clamps the water plants through the elastic sheet 411 and the toothed plate 52. As the conveying steel belt 41 and the toothed plate 52 continue to rotate, the elastic sheet 411 and the toothed plate 52 continue to pull the water plants upward. At this time, the upper part of the water plants is held by the elastic sheet 411 and the toothed plate 52 and moves forward with the hull 1, and the water plants are in a forward inclined state. Then, the hull 1 moves forward to drive the push block 6 forward to abut against the middle section region of the water plants. In the process that the hull 1 drives the push block 6 to move forward, the conveying steel belt 41 and the toothed plate 52 continue to pull the water plants upward. The push block 6 applies a transverse thrust to the water plants from the middle of the water plants to uproot the water plants from a river bed. The uprooted water plants are carried away upward and backward by the conveying steel belt 41 of the steel belt conveying mechanism 4, and the rest water plants are continuously harvested as above.

If the upper section region of the water plants is much higher than the water surface, the driver needs to control two second electric push rods 106, and the second electric push rods 106 push the sliding bracket 105 to move forward along the guide rail 104. The sliding bracket 105 drives the push block 6 to move forward, so that when the driver drives the hull 1 to move forward, the push block 6 firstly bends forward the water plants far above the water surface from the middle section region of the water plants, and then the conveying steel belt 41 and the toothed plate 52 clamp and stretch up the bent upper section region of the water plants. As the push block 6 moves forward to apply the transverse thrust to the water plants, the water plants are uprooted to avoid the phenomenon that the water plants are twined on the rotating driven shaft 5 because of too high upper section region of the water plants.

If the water depth is deep, the driver controls the first electric push rod 103, and the first electric push rod 103 pulls the pull plate 102 to drive the first rotating shaft 101 to rotate. The first rotating shaft 101 drives two guide rails 104 to rotate downward, and the push block 6 flips down. The driver controls the second electric push rod 106 to push the sliding bracket 105 forward along the guide rails 104, the push block 6 extends down into half of the water depth, and the push block 6 keeps close to the middle section region of the water plants in the forward process to smoothly uproot the water plants.

The conveying steel belt 41 of the steel belt conveying mechanism 4 carries away the pulled water plants backwards and upwards through the elastic sheet 411, so that the water plants enter a bucket-shaped structure formed by the limiting plate 7 and the conveying steel belt 41 on the upper side of the steel belt conveying mechanism 4. When the water plants pass through the press roller 201, the water plants are blocked by the press roller 201. At this time, the conveying steel belt 41 forcibly drives the water plants to continue to move backward through the elastic sheet 411, so that the elastic sheet 411 pushes the water plants to pass through the lower part of the press roller 201 and drives the press roller 201 to rotate. The rotating press roller 201 presses the water plants back through the structures of the bumps 2011 to drive the elastic sheet 411 to bend downward and deform, and the reverse elasticity generated by the deformation of the elastic sheet 411 is matched with the reverse pressure of the press roller 201 to squeeze out most of the water inside the water plants between the elastic sheet 411 and the press roller 201 to complete the squeezing work of the water in the water plants. The water squeezed out from the water plants flows down back into the water along the fixed plate 3.

When the elastic sheet 411 pushes the water plants to pass through the lower part of the press roller 201, the rotating press roller 201 drives the cams 202 to rotate, and the cams 202 press the shifting lever 204 to drive the second rotating shaft 203 to rotate. The shifting lever 204 drives the torsion spring 205 to conduct torsion to generate torsional force. When the second rotating shaft 203 drives the cutters 8 to flip upward, each cutter 8 simultaneously precuts the water plants that enter the bucket-shaped structure into multiple parts.

Then, the conveying steel belt 41 continues to convey the water plants that complete the water squeezing treatment and precutting treatment. When the water plants are conveyed to the rear and upper part of the steel belt conveying mechanism 4, the water plants fall down between the roller body 91 and the steel belt conveying mechanism 4, and meanwhile, the output shaft of the second motor 92 drives the roller body 91 to rotate. When the roller body 91 drives the blade 93 to rotate counterclockwise at high speed at the left viewing angle, the blade 93 cuts the falling water plants. At the same time, the water plants are blocked downward by the elastic sheet 411 on the conveying steel belt 41, and cut up by the blade that conducts upward cutting to complete the cutting work of the water plants. The water plants after cutting fall down into the hull 1 from the gap between the baffle plate 94 and the steel belt conveying mechanism 4 or from the discharge hole 941.

Those skilled in the art shall understand that the above embodiments do not limit the present invention in any form. Technical solutions obtained by adopting equivalent replacement or equivalent transformation shall be included in the protection scope of the present invention.

The invention claimed is:

1. A cleaning ship for water surface treatment for harvesting water plants, comprising a hull (1), an installing frame (2), a fixed plate (3) and a steel belt conveying mechanism (4); the installing frame (2) is installed on the front side of the hull (1); the upper side of the installing frame (2) is fixedly connected with the fixed plate (3); the steel belt conveying mechanism (4) is installed in the middle of the fixed plate (3); wherein the cleaning ship further comprises a driven shaft (5), a push block (6), a limiting plate (7), cutters (8) and a cutting mechanism; the lower side of the fixed plate (3) is rotatably connected with the driven shaft (5); the left end of the driven shaft (5) is fixedly connected with a second spur gear (51); a first motor (42) on the upper side of the steel belt conveying mechanism (4) drives the entire steel belt conveying mechanism (4) to conduct conveying work; at the same time, a power shaft (43) on the lower side of the steel belt conveying mechanism (4) drives the driven shaft (5) to rotate through engagement of a first spur gear (431) and the second spur gear (51); water plants are hooked by a plurality of toothed plates (52) fixedly connected on the surface of the driven shaft (5), and pulled upward with the cooperation of an elastic sheet (411) fixedly connected on the outer surface of each conveying steel belt (41) in the steel belt conveying mechanism (4); an adjusting assembly is installed on the rear side of the fixed plate (3); the front side of the adjusting assembly is connected with the push block (6), and in the process that the elastic sheet (411) and the toothed plates (52) pull the water plants, the push block (6) uproots the water plants from the middle ends of the water plants; the front side of the fixed plate (3) is fixedly connected with the limiting plate (7); a rolling assembly is installed on the rear side of the limiting plate (7); the front side of the rolling assembly is connected with a plurality of cutters (8); the cutters (8) preliminarily cut off the water plants stacked together; the rolling assembly is matched with the conveying steel belt (41) to remove most of water in the water plants; and then the water plants are cut up by the cutting mechanism installed at the rear of the fixed plate (3).

2. The cleaning ship for water surface treatment for harvesting water plants according to claim 1, wherein the cutting mechanism comprises a roller body (91), a second motor (92), blades (93) and a baffle plate (94); the rear part of the upper side of the fixed plate (3) is rotatably connected with the roller body (91); the rear side of the fixed plate (3) is fixedly connected with the second motor (92); an output shaft of the second motor (92) is fixedly connected with the roller body (91); a plurality of blades (93) are fixedly connected around an outer surface of the roller body (91); the rear side of the fixed plate (3) is fixedly connected with the baffle plate (94), and the baffle plate (94) surrounds the rear side of the roller body (91).

3. The cleaning ship for water surface treatment for harvesting water plants according to claim 2, wherein the lower side of the baffle plate (94) is provided with a plurality of structures of discharge holes (941).

4. The cleaning ship for water surface treatment for harvesting water plants according to claim 1, wherein the front end of the push block (6) is configured as a cambered surface structure.

5. The cleaning ship for water surface treatment for harvesting water plants according to claim 1, wherein the front side of the push block (6) is fixedly connected with a plurality of dividing strips (61) at equal distances.

6. The cleaning ship for water surface treatment for harvesting water plants according to claim 1, wherein the limiting plate (7) and the conveying steel belt (41) on the upper side of the steel belt conveying mechanism (4) have a backward contracted bucket-shaped structure.

7. The cleaning ship for water surface treatment for harvesting water plants according to claim 1, wherein the rear ends of the cutters (8) are configured as upward bent arc structures.

8. The cleaning ship for water surface treatment for harvesting water plants according to claim 1, wherein the adjusting assembly comprises a first rotating shaft (101), a pull plate (102), a first electric push rod (103), guide rails (104), sliding brackets (105) and second electric push rods (106); the rear side of the fixed plate (3) is rotatably connected with the first rotating shaft (101); the lower side of the first rotating shaft (101) is fixedly connected with the pull plate (102); the rear side of the fixed plate (3) is rotatably connected with the first electric push rod (103) through the rotating shaft; the telescopic end of the first electric push rod (103) is rotatably connected with the pull plate (102) through the rotating shaft; the left end and the right end of the first rotating shaft (101) are fixedly connected with a guide rail (104) respectively; the middle of each of the two guide rails (104) is slidably connected with a sliding bracket (105) respectively; a second electric push rod (106) is fixedly connected between the two guide rails (104) and the sliding brackets (105) respectively; and the two sliding brackets (105) are fixedly connected with the push block (6).

9. The cleaning ship for water surface treatment for harvesting water plants according to claim 1, wherein the rolling assembly comprises a press roller (201), cams (202), a second rotating shaft (203), shifting levers (204) and torsion springs (205); the rear side of the limiting plate (7) is rotatably connected with the press roller (201); the left end and the right end of the press roller (201) are fixedly connected with a cam (202) respectively; the rear side of the limiting plate (7) is rotatably connected with the second rotating shaft (203), and the second rotating shaft (203) is located on the front side of the press roller (201); the left end and the right end of the second rotating shaft (203) are fixedly connected with a shifting lever (204) respectively; a torsion spring (205) is fixedly connected respectively between the two shifting levers (204) and the limiting plate (7), and the torsion springs (205) are sleeved on the outer surface of the second rotating shaft (203); and each cutter (8) is fixedly connected to the middle of the second rotating shaft (203).

10. The cleaning ship for water surface treatment for harvesting water plants according to claim 9, wherein a plurality of structures of bumps (2011) are arranged around the outer surface of the press roller (201).

\* \* \* \* \*